US 6,873,619 B1

(12) United States Patent
Edwards

(10) Patent No.: US 6,873,619 B1
(45) Date of Patent: Mar. 29, 2005

(54) METHODS, SYSTEMS AND COMPUTER PROGRAM PRODUCTS FOR FINDING NETWORK SEGMENT PATHS

(75) Inventor: Anthony Van Vechten Edwards, Durham, NC (US)

(73) Assignee: Tavve Software Co., Morrisville, NC (US)

( * ) Notice: Subject to any disclaimer, the term of this patent is extended or adjusted under 35 U.S.C. 154(b) by 0 days.

(21) Appl. No.: 09/571,478

(22) Filed: May 16, 2000

(51) Int. Cl.$^7$ ................................................ H04L 12/28
(52) U.S. Cl. ...................................... 370/392; 370/401
(58) Field of Search ................................. 370/392, 401, 370/400, 389, 351, 252

(56) References Cited

U.S. PATENT DOCUMENTS

| | | | |
|---|---|---|---|
| 4,545,011 A | 10/1985 | Lyon et al. | |
| 5,049,873 A | 9/1991 | Robins et al. | |
| 5,107,450 A | 4/1992 | Lawrenz | |
| 5,257,393 A | 10/1993 | Miller | |
| 5,572,640 A | 11/1996 | Schettler | |
| 5,634,009 A | 5/1997 | Iddon et al. | |
| 5,706,436 A | 1/1998 | Lewis et al. | |
| 5,732,213 A | 3/1998 | Gessel et al. | |
| 5,764,915 A | 6/1998 | Heimsoth et al. | |
| 5,809,286 A | 9/1998 | McLain, Jr. et al. | |
| 6,314,093 B1 * | 11/2001 | Mann et al. | 370/351 |
| 6,317,415 B1 * | 11/2001 | Darnell et al. | 370/230 |
| 6,400,681 B1 * | 6/2002 | Bertin et al. | 370/218 |
| 6,657,963 B1 * | 12/2003 | Paquette et al. | 370/236 |
| 6,657,972 B1 * | 12/2003 | Syed et al. | 370/254 |

OTHER PUBLICATIONS

Butterfield, "System Performance Monitor/2 Reference," International Business Machines Corporation (1991).
Brochure, "The DA–30® Family of Internetwork Analyzers", Wandel & Goltermann (1994).
Brochure, "DA–30C Benchmarking Capabilities", Wandel & Goltermann (1995).
Brochure, "Vital Signs VisionNet", BlueLine Software, Inc., including inserts "LAN Agent", "VTAM Agent", "NCPL Agent" (1995).
Brochure, Vital Signs VisionNet (1995).
Brochure, "SmartBits: Switch Testing In Its Simplest Form . . ." Netcom Systems, Inc. (1995).
Brochure, "EconNET™: Networked Applications Performance Management", Compuware Corporation (1995).
Brochure, Hot off the Shelf: Application Management, Data Communications (Jan. 1996).
Brochure, "10 Reasons Why You Need an Applications View of Your Network, "Compuware Corporation (Jan. 9, 1996).
Brochure, "Network General Corporation: Products and Services", Network General Corporation (1995).
Brochure, "ProView: Network Performance Management Systems", Network Telemetrics, Inc. (1995).

(Continued)

*Primary Examiner*—Chau Nguyen
*Assistant Examiner*—Blanche Wong
(74) *Attorney, Agent, or Firm*—Myers Bigel Sibley & Sajovec, P.A.

(57) ABSTRACT

Methods, systems and computer program products are provided which may provide network segment path information on a communication network connecting two devices which includes not only devices, such as routers, providing layer three information, but also devices within a subnet, such as a bridge or switch, that maintain layer two information instead of layer three information in their address tables. A link layer data base supporting identification of the bridge/switch devices may be generated and updated automatically by queries to the bridge/switch devices on supported networks and active traffic generation may be used to provide up to date information from the bridge/switch devices. The network segment path information in turn may be used to support root cause analysis of faults on the network.

55 Claims, 8 Drawing Sheets

OTHER PUBLICATIONS

Brochure, "Managing the User Environment Across Integrated SNA and IP Networks", Network Telemetrics, Inc. (1995).

Brochure, "Using Performance Baselines to Manage Network Service Levels", Williamson, W., Network Telemetrics, Inc. (1995).

Brochure, "Standard Based Distributed Diagnostics for Enterprise Networks", Frontier Software Development, Inc. (Sep. 1995).

Brochure, "QualityWorks–The Most Complete Client/Server Testing Solution You Can Buy", Segue Software Products (1996).

Brochure, "LANQuest: Net/WRx", LANQuest (Sep. 12, 1995).

Brochure, "NETBENCH(R) 3.01 FREQUENTLY ASKED QUESTIONS", Ziff–Davis Benchmark Operation.

Brochure, EcoNET: The View from the Top, Hurwitz Consulting Group, Inc. (1995).

Brochure, "Visual OnRamp Managed Internet Access Device" (Jan. 1996).

Brochure, "FirstSense".

Brochure "NextPoint".

Brochure, "NextPoint Frame Relay".

Brochure , "VeriServ™," Response Networks, Inc.

Brochure, "Service Management Architecture Product Overview," Jyra Research, Inc.

Brochure, "Optimal Application Expert" Optical Networks Corp. (1997).

Article, Sobel, Ken; "*Compuware's EcoSCOPE*"; *Hurwitz Group. Inc* (Sep. 1997).

Tavve Software Documentation Installation and User's Guide, 1997.

* cited by examiner

US 6,873,619 B1

METHODS, SYSTEMS AND COMPUTER PROGRAM PRODUCTS FOR FINDING NETWORK SEGMENT PATHS

FIELD OF THE INVENTION

The present invention relates to network communications and, more particularly, to analysis of network communication paths.

BACKGROUND OF THE INVENTION

The explosive growth of e-commerce transactions and other business across the Internet has resulted in significant growth in network traffic. This tremendous increase in transactions over data networks and/or voice networks leaves increasing numbers of users dependent on reliable network access. For emerging e-tailers, Website hosting companies, enterprises and application service providers, network downtime or poor network performance may be unacceptable or even catastrophic. It is desirable for network applications to be as consistently available in the future as telephone service is today. To support network access, network based enterprises are increasingly relying on service providers who contract to provide network access with performance expectations established pursuant to Service Level Agreements (SLAs). These SLAs are further being refined to attempt to ensure application availability. However, the increasing complexity of the networks and shortages of qualified network management personnel make the SLAs more difficult to enforce.

Network managers typically rely on some form of system management and/or network management tools to help automate performance management tasks to increase the efficiency of the network management staffs. Even with these tools, network management staffs are typically required to commit resources to integrating and customizing the tools to work in the heterogeneous network environments which may include, for example, hardware from a variety of vendors, executing a variety of operating systems and communication protocols and supporting a variety of application programs for different end user requirements.

Existing network enterprise management software applications such as TME 10 NetView (NetView) available from Tivoli Corporation and OpenView Network Node Manager (OpenView) available from Hewlett-Packard Corporation are attempts to assist network management staffs with managing increasingly complex local and wide area network environments. Such applications and other known passive and active network monitoring tools available, for example, from VitalSigns, Inc. and Ganymede Software Corporation, may generate large quantities of data tracking network performance over extended time periods. However, the mere volume of such data may further complicate the problem solving challenge for network management staffs.

One approach to determining the network related cause for detected performance degradations is path analysis. For example, the Simple Network Management Protocol (SNMP) supports "findroute" operations and Internet Control Message Protocol (ICMP) supports "traceroute" operations which may identify the network path between two designated devices on a communications network. The findroute operations provide layer three Internet Protocol (IP) information identifying each router between the two designated devices. This information may be used to support problem cause isolation responsive to fault indications, such as those provided by NetView and OpenView.

SUMMARY OF THE INVENTION

Embodiments of the present invention include methods, systems and computer program products which may provide network segment path information on a communication network connecting two devices which includes not only devices, such as routers, providing layer three information, but also devices within a subnet, such as a bridge or switch, that maintain layer two information instead of layer three information in their address tables. A link layer data base supporting identification of the bridge/switch devices may be generated and updated automatically by queries to the bridge/switch devices on supported networks and active traffic generation may be used to provide up to date information from the bridge/switch devices. The network segment path information in turn may be used to support root cause analysis of faults on the network.

In particular embodiments of the present invention, methods are provided for finding a network segment path for a communication on a communication network. Link layer information is obtained from at least one connecting node on the communication network that does not use layer three protocol information to process communications from a plurality of devices passing through the at least one connecting node. A network segment path for a communication over the communication network is determined based on the obtained link layer information. The network segment path includes an identification of connecting nodes in the network segment path that do not use layer three protocol information to process communications from a plurality of devices passing through the connecting nodes.

In further embodiments of the present invention, the at least one connecting node is a bridge/switch and the link layer information is obtained by obtaining an identification of the plurality of devices from the bridge/switch. In particular embodiments, a media access controller (MAC) address and an associated connecting port number of the bridge/switch are obtained for the plurality of devices. The obtained MAC addresses and associated connecting port numbers along with an identification of the bridge/switch and the respective ones of the plurality of devices may be stored as records in a link layer data base.

In other embodiments of the present invention, the records in the link layer data base are time stamped. Records in the link layer data base may be aged out using the time stamp information. Aging out may include detecting duplicate records and deleting an older one of detected duplicate records. Conflicts may also be detected between records indicating movement of at least one of the bridge/switch and one of the plurality of devices and records associated with a detected conflict may be deleted. In particular embodiments, conflicts between records indicating movement may include detecting connection of one of the plurality of devices to a plurality of bridge/switches having the same root cost to detect movement of the one of the plurality of devices. All records associated with a moved bridge/switch may be detected and records associated with the one of the plurality of devices having a time stamp older than at least one other record associated with the one of the plurality of devices may be deleted where movement of an endpoint device is detected.

In further embodiments of the present invention, the plurality of devices and the bridge/switch are on a subnet and, before obtaining a media access controller (MAC) address and an associated connecting port number of the bridge/switch for the plurality of devices, communications traffic by the plurality of devices on the subnet is initiated.

The MAC address and associated connecting port number information may be obtained by iteratively querying the bridge/switch for next entries in an address table of the bridge/switch using SNMP commands, utilizing Management Information Base (MIB) definitions, until all entries in the address table have been obtained. In addition, communications traffic by the plurality of devices on the subnet may also be initiated if a specified time is exceeded before all entries in the address table have been obtained.

In other embodiments of the present invention, the communication is between a first device and a second device. A network path between the first device and the second device is determined. The network path between the first device and the second device may be determined by executing a SNMP findroute operation. Subnets in the network path are identified. A subnet path is determined for each of the identified subnets in the network path using a link layer data base. The subnets may be identified by identifying a first endpoint and a second endpoint in the network path for each subnet in the network path. In particular embodiments, a subnet path is determined by finding a first path from the first endpoint to a root bridge/switch of the subnet using the link layer data base and finding a second path from the second endpoint to the root bridge/switch using the link layer data base. Non-utilized common nodes of the first path and the second path are removed and the first path and the second path are connected at a common node to provide the subnet path. The associated port number for each node along the first path and the second path may also be determined from the link layer data base and identified in the subnet path.

In further embodiments of the present invention, the first path is found by identifying bridges/switches associated with the first endpoint in the link layer data base and ordering the identified bridges/switches associated with the first endpoint in root cost order from highest to lowest to provide the first path. In addition, additional bridges/switches associated with the identified bridges/switches may be identified in the link layer data base and the identified bridges/switches associated with the first endpoint and the additional bridges/switches may be ordered in root cost order from highest to lowest to provide the first path. The second path may be determined in the same manner.

In other embodiments of the present invention, methods are provided for determining a path between a first endpoint and a second endpoint on a subnet. A first path is found from the first endpoint to a root bridge/switch of the subnet using a link layer data base. A second path is found from a second endpoint to the root bridge/switch using the link layer data base. Non-utilized common nodes of the first path and the second path are removed. The first path and the second path are connected at a common node to provide the path on the subnet.

While the invention has been described above primarily with respect to method aspects of the invention, both systems and/or computer program products are also provided.

DETAILED DESCRIPTION OF PREFERRED EMBODIMENTS

Figure 1:
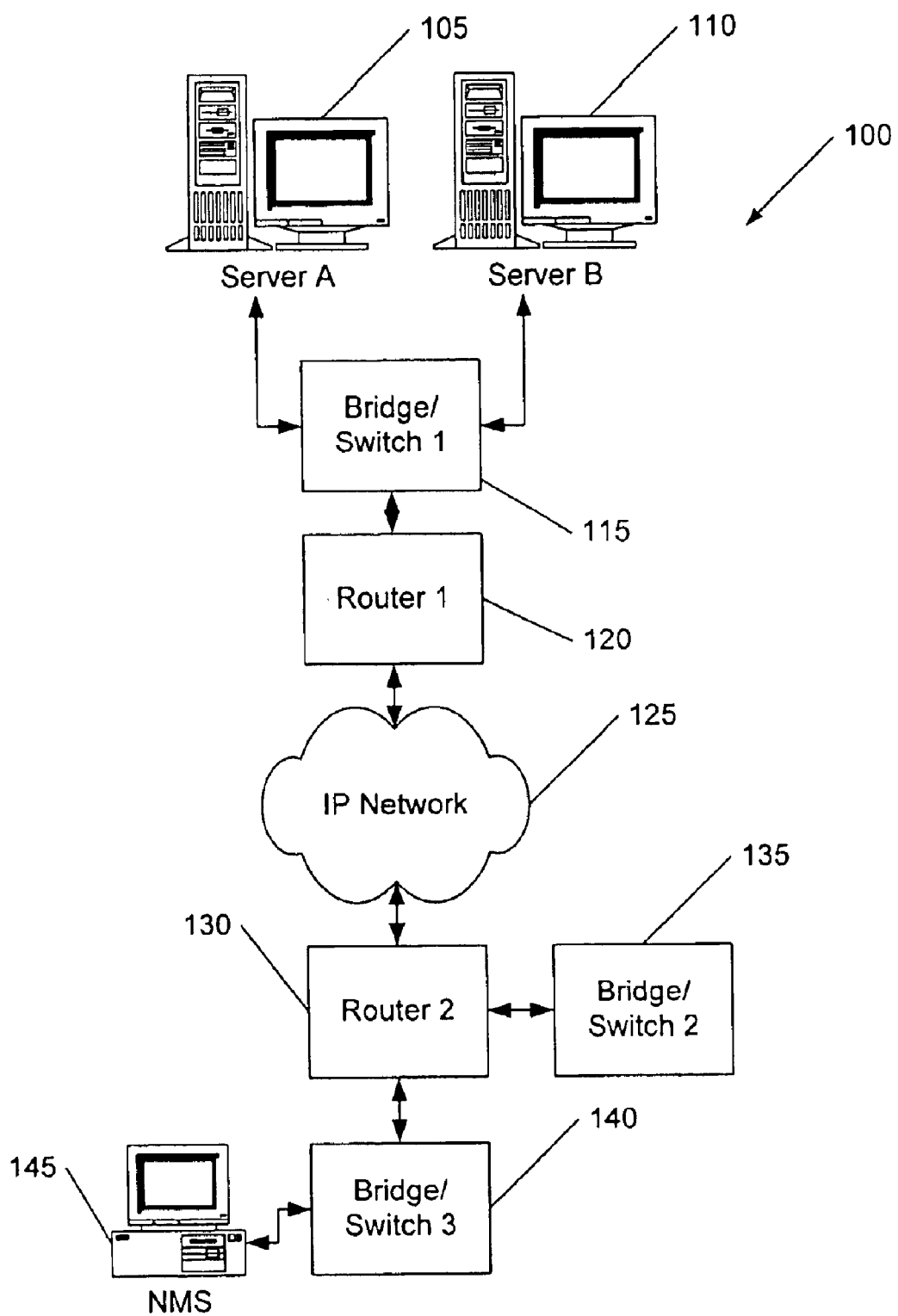
FIG. 1 is a block diagram of a network of data processing systems connected over a communications network and including a network management station (NMS) according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely software embodiment or an embodiment combining software and hardware aspects. Furthermore, the present invention ma take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carry ing out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus. (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Various embodiments of the present invention will now be described with reference to FIGS. 1 through 8. FIG. 1 is a block diagram of a computer network including a network management station (NMS) supporting network segment path evaluation which may be used for determining a network segment path between a first endpoint and a second endpoint on a network. The network segment path information may further be used for root cause analysis responsive to detected faults on the communication network. As illustrated in FIG. 1, the communication network 100 includes a plurality of connecting nodes and endpoint nodes. Server A 105 and server B 110 as well as the NMS 145 are shown as endpoint nodes in FIG. 1. However, it is to be understood that each of these devices may also operate as a connecting node to other devices on the communication network 100.

Both server A 105 and server B 110 connect through bridge/switch 1 115. Note that, as used herein, the terms bridge and switch will be used interchangeably and referred to as "bridge/switch" as such devices will be understood by those of skill in the art to be essentially interchangeable for purposes of the present invention. A bridge/switch as used herein may best be understood by contrast to a router, such as router 1 120 connected to the bridge switch 1 115 in FIG. 1. In particular, a bridge/switch, as contrasted with a router, does not use layer three protocol information, for example, Internet Protocol (IP) information, to process communications from a plurality of devices (such as server A 105 and server B 110) passing through the bridge/switch. In other words, the bridge/switch, as contrasted with a router does not provide IP information on communications passing through the bridge/switch. In contrast, a router provides such layer three IP information. For example, the SNMP findroute operations would identify routers on a network path between two designated devices but would not provide an identification of bridge/switch devices in the network path.

The bridge/switch 1 115 illustrated in FIG. 1 connects through the router 1 120 to the IP network 125. Thus, the server A 105, the server B 110 and the bridge/switch 1 115 all reside on a common subnet defined by their shared connection to the router 1 120. The IP network 125 is further connected to the router 2 130. The router 2 130 defines a second subnet including the bridge/switch 2 135, the bridge/switch 3 140 and the NMS 145.

As described above, 2 subnets are shown in FIG. 1. However, it is to be understood that the IP network 125 is illustrated schematically as a cloud and may include one or more subnets along the network's path between the router 1 120 and the router 2 130. The number of subnets, as used herein, between the router 1 120 and the router 2 130 is a function of the number of router devices contained in the path of the IP network 125 between the router 1 120 and the router 2 130.

Operations of the NMS 145 will be further described herein with reference to the flowchart illustrations. It is to be understood, however, that the communication network 100 may be provided by wired or wireless links using a variety of physical layer media and still stay within the teachings and scope of the present invention. In keeping with the present invention, while the bridge/switch 1 115, the bridge/switch 2 135, and the bridge/switch 3 140 do not provide layer three IP identification information for connecting devices, they do provide and maintain layer 2 information identifying other endpoint nodes or connecting nodes connected to ports of the respective bridge/switches. Typically, such layer 2 information is provided based on a media access controller (MAC) address.

Figure 2:
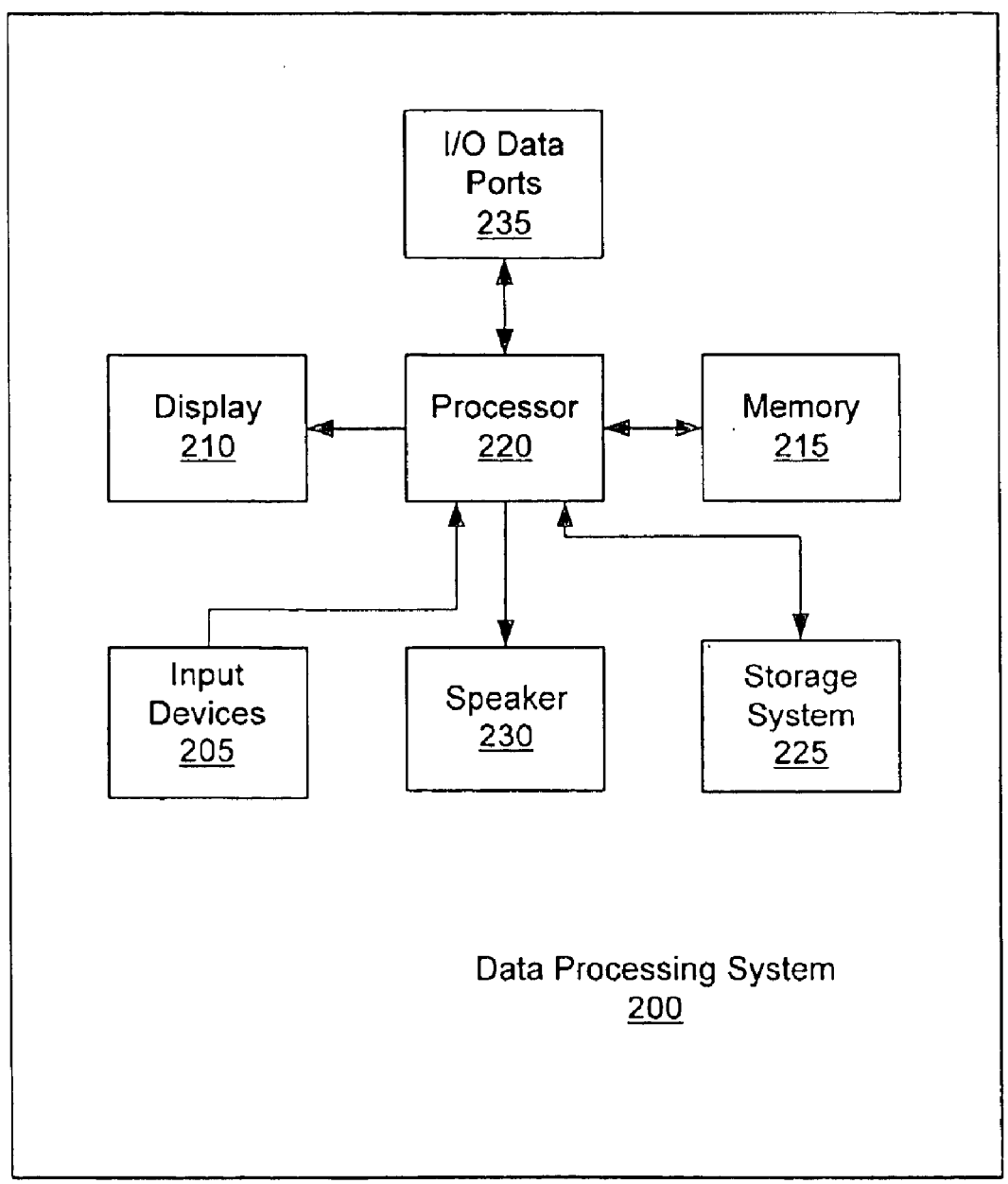
FIG. 2 is a block diagram of a data processing system suitable for use in embodiments of the present invention.

An exemplary embodiment of a data processing system 200 suitable for use as a network segment path analyzer system in accordance with embodiments of the present invention is illustrated in FIG. 2 and typically includes input device(s) 205 such as a keyboard or keypad, a display 210, and a memory 215 that communicate with a processor 220. The data processing system 200 may further include a speaker 230, and an I/O data port(s) 235 that also communicate with the processor 220. The I/O data port 235 can be used to transfer information between the data processing system 200 and another computer system or a network (e.g., the Internet) such as communication network 100. These components may be conventional components such as those used in many conventional data processing systems which may be configured in accordance with the present invention to operate as described herein. The present invention may be utilized with any data processing systems which are capable of carrying out the operations of embodiments of the present invention described herein.

Figure 3:
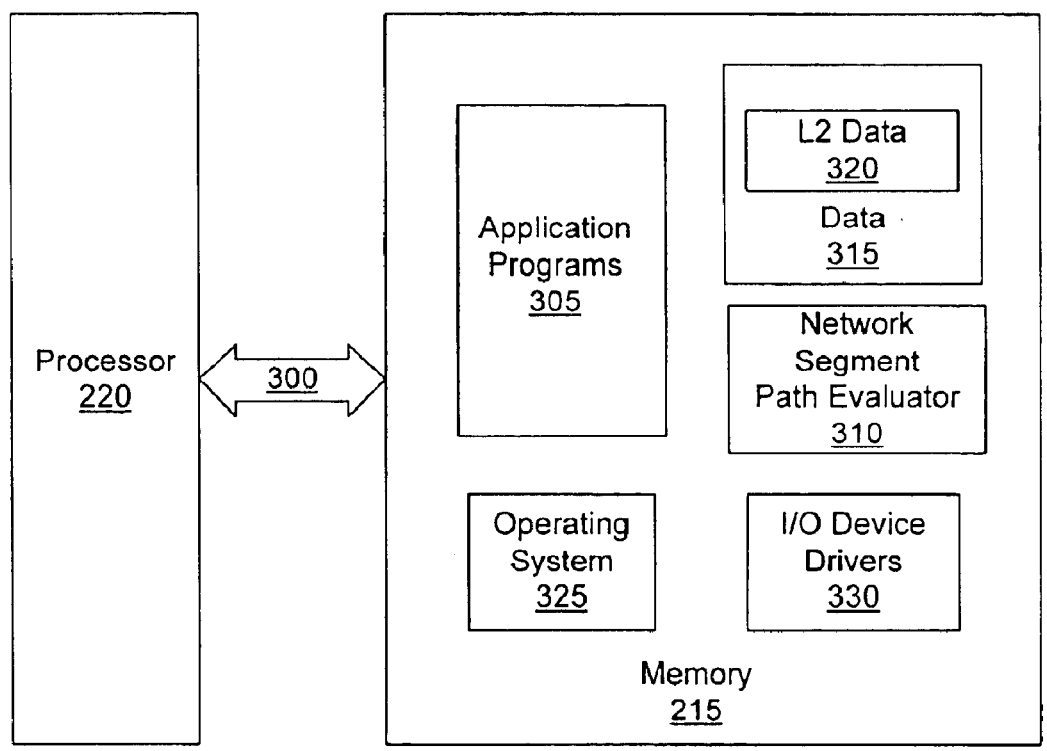
FIG. 3 is a more detailed block diagram of data processing systems according to embodiments of the present invention.

FIG. 3 is a block diagram of a data processing system that illustrates systems, methods, and computer program products in accordance with embodiments of the present invention. The processor 220 communicates with the memory 215 via an address/data bus 300. The processor 220 can be a variety of commercially available or custom microprocessors. The memory 215 is representative of the overall hierarchy of memory devices containing the software and data used to implement the functionality of the data processing system 200. The memory 215 can include, but is not limited to, the following types of devices: cache, ROM, PROM, EPROM, EEPROM, flash, SRAM, and DRAM.

As shown in FIG. 3, the memory 215 may contain several categories of software and data used in the data processing system 200: the operating system 325; the application programs 305, a network segment path evaluator 310, the input/output (I/O) device drivers 330; and the data 315. As will be appreciated by those of skill in the art, in certain embodiments of the present invention, the operating system 325 may be a variety of operating systems suitable for use with communication network as described herein.

The I/O device drivers 330 typically include software routines accessed through the operating system 325 by the application programs 305 and/or the network segment path evaluator 310 to communicate with devices such as the input devices 205, the display 210, the speaker 230, the I/O data port(s) 235, and certain components of the memory 215. The application programs 305 are illustrative of the programs that implement the various features of the data processing system 200. The network segment path evaluator 310 preferably carries out the operations described herein in various embodiments of the present invention for determining a network segment path between two devices. In various embodiments, the network segment path evaluator 310 further provides for root cause analysis. The data 315 represents the static and dynamic data used by the application programs 305, the operating system 325, the I/O device drivers 330, and other software programs that may reside in the memory 215. As shown in the embodiments of FIG. 3, the data 315 includes layer 2 (L2) information data 320 providing a link layer data base.

While the present invention is illustrated, for example, with reference to the network segment path evaluator 310 being a separate program, as will be appreciated by those of skill in the art, the network segment path evaluator 310 may also be incorporated into the operating system 325 or the I/O device drivers 330. Thus, the present invention should not be construed as limited to the configuration of FIG. 3 but is intended to encompass any configuration capable of carrying out the operations described herein.

Operations supported by a network management station according to various embodiments of the present invention will now be described with reference to the flowchart illustrations of FIGS. 4 through 8. Operations for finding a network segment path (i.e., a network path including identification of bridge/switches) for a communication on a communication network for embodiments of the present invention will be first described with reference to FIG. 4. Operations begin at block 400 with obtaining of link layer information from at least one connecting node on the communication network that does not use IP layer three information to process communications, from a plurality of devices connected to the connecting node, which passed through the connecting node. As will be described more fully herein, operations at block 400 may include obtaining MAC address and associated connecting port number record information from address tables of bridge/switch devices on the supported communication network. This information may be provided as a prepared database to the network management station but is preferably established and updated automatically by the network management station through queries to the various bridge/switch devices as will be further described herein.

In addition to obtaining the link layer information, in various embodiments of the present invention, the obtained link layer information may be aged out (block 405). Aging out of records in a link layer database containing the link layer information may include both detecting duplicate records and detecting conflicts. Where duplicate records are detected an older one of the detected duplicate records may be deleted. Such aging operations may be supported by time stamping records stored in the link layer database. Conflicts between records may also be detected where the respective records indicate movement of either a connecting node, such as a bridge/switch, or an endpoint node, such as a server. Records associated with the detected conflict may then be deleted. For example, where the detected conflict is associated with movement of a connecting node, such as a bridge/switch, all records associated with the moved bridge/switch are preferably deleted. Such an event typically is associated with a network reconfiguration which may leave all records associated with the moved bridge/switch as suspect and unreliable. Detection of a conflict associated with movement of an endpoint device, such as a server, may be provided by detection of the device's associated MAC address connected with more than one bridge/switch having the same associated root cost. A root cost is assigned by a subnet with each hop from the root bridge/switch typically being assigned a greater root cost (for example, 50, 100, 150 etc.). As network communication protocols typically maintain only one active path to a root bridge on a subnet for any device, an endpoint node device should not appear in two different bridge/switches having the same root cost and, thus, the older historical information is preferably deleted when such a conflict is detected. It is to be understood that different criteria for detecting conflicts may be applied depending on the particular routing protocols of a subnet.

Figure 4:
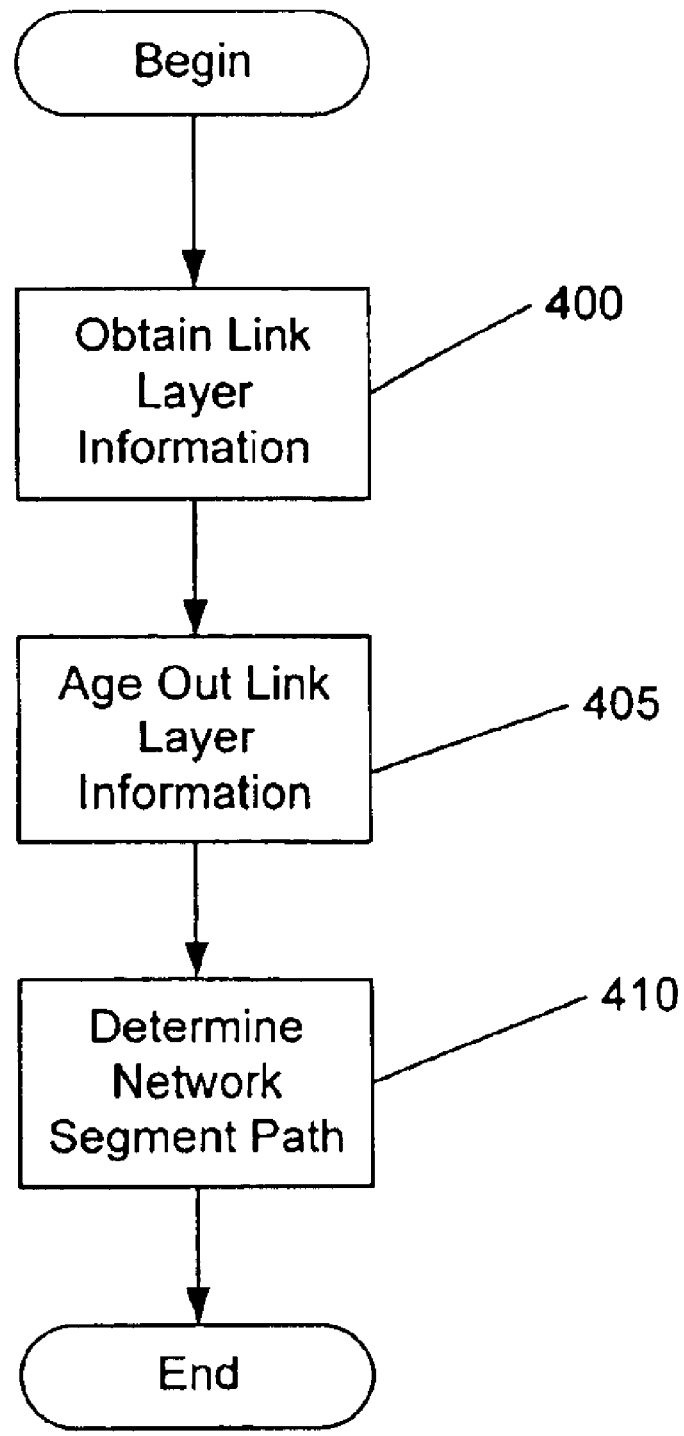
FIG. 4 is a flowchart illustrating operations for obtaining network segment path information according to embodiments of the present invention.

Operations for finding a network segment path for a communication on a communication network as illustrated in the embodiments of FIG. 4 further include determining the network segment path for a communication over the communication network based on the obtained link layer information (block 410). The network segment path, as described herein, includes an identification of connecting nodes, such as bridge/switches, in the network path that do not provide layer three protocol information (such as IP information) on the communications passing through the connecting nodes.

Figure 5:
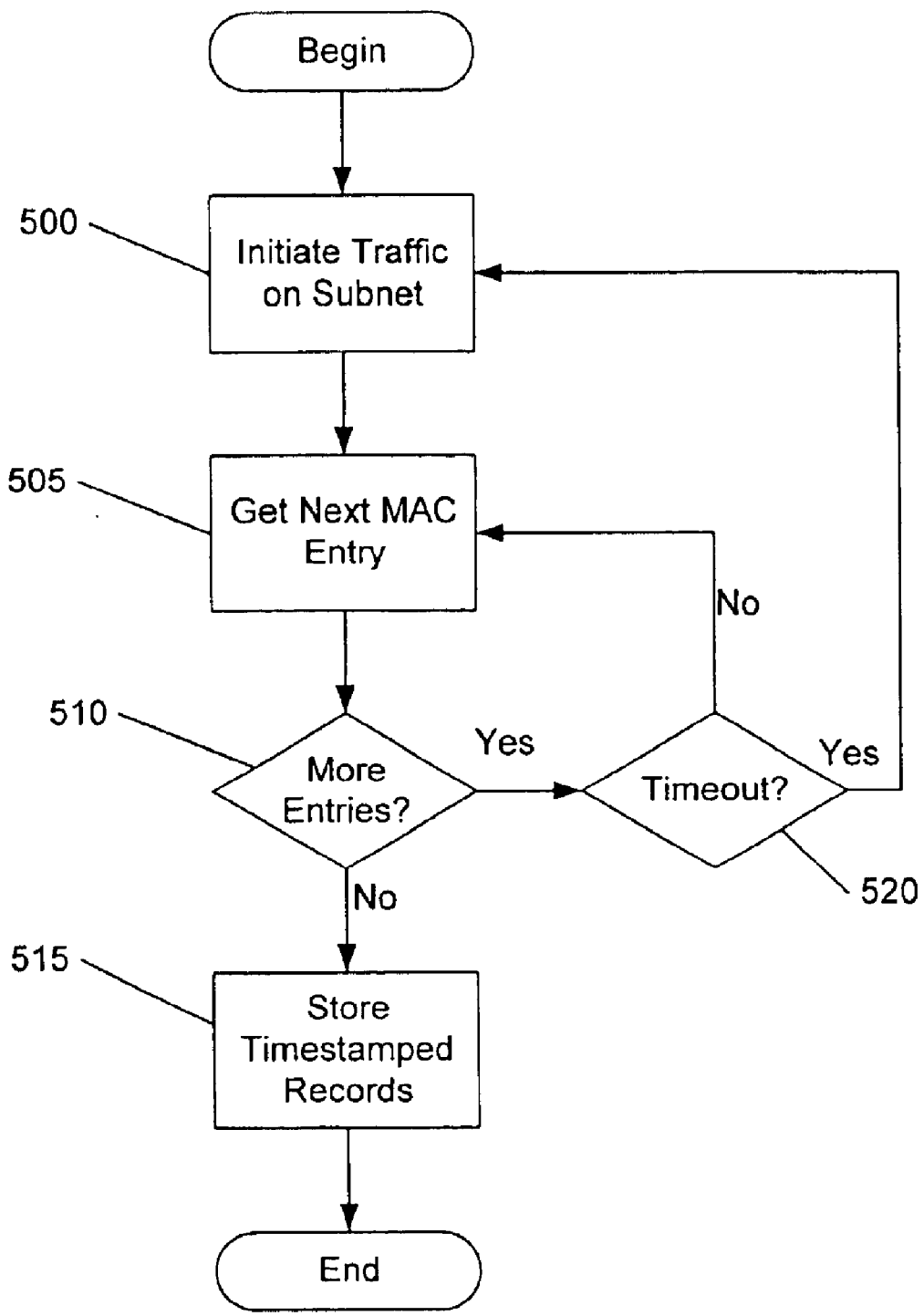
FIG. 5 is a flowchart illustrating operations for establishing a link layer database according to embodiments of the present invention.

Referring now to FIG. 5, operations for obtaining link layer information from a bridge/switch will now be further described according to various embodiments of the present invention. For the embodiments illustrated in FIG. 5, link layer information is obtained with the assistance of active traffic generation. Accordingly, operations begin by initiating traffic on a subnet (block 500). However, it is to be understood that link layer information may be obtained without actively initiating traffic by relying on the normal communications activity of the communication network to provide up-to-date information from the respective bridge/switches on various subnets supported (covered) by the link layer information data base. Furthermore, it is to be understood that operations will be described with reference to FIG. 5 for obtaining link layer information from a single bridge/switch. However, such operations are preferably performed on a periodic basis for each bridge/switch on a subnet as well as for different subnets comprising the communication network supported by the link layer information data base.

Operations for obtaining an identification of devices, such as servers or other bridge/switches which are connected to, and, thus, pass communications through, the bridge/switch being queried will now be described with reference to block 505 through 520. More particularly, for the embodiments illustrated in FIG. 5, the obtained information includes a media access controller (MAC) address and an associated connecting port number of the bridge/switch for each of a plurality of such devices connected to the bridge/switch. Alternatively, the MAC address and associated connecting port number information may only be obtained for ones of the plurality of such devices which are connected to the bridge/switch through a port other than the port which ultimately connects to the root bridge/switch. The NMS requests from the bridge/switch the next record entry in an address table of the bridge/switch (block 505). As illustrated in FIG. 5, the NMS queries the bridge/switch for the MAC address and port number using MIB commands at block 505. If all of the entries in the bridge/switches' address table have already been provided (block 510), the obtained records are time stamped and stored in the link layer data base (block 515). Each record stored in the link layer data base may include an obtained MAC address, the associated connected port number, an identification of the bridge/switch providing the information and, preferably, an identification of the respective connected device corresponding to the MAC address (i.e., such as the Internet address of the connected device). A suitable record form may, for example, be provided with the following fields:

switch name (IP)

port number on switch attached device IP address/hostname attached device subnet address root cost time/date stamp.

If there are more entries remaining in the address table of the bridge/switch (block 510), FIG. 5 further shows a timeout determination at block 520. Timeout operations at block 520 may be provided to allow communications traffic initiation to repeat if a specified time is exceeded before all entries in the address table of the bridge/switch have been obtained. For example, a one second timeout period could be provided in which case, if less than one second has passed since traffic was last initiated on the subnet (block 500), then operations return to block 505 where an additional MIB command is transmitted from the NMS to the bridge/switch to obtain the next MAC entry in the bridge/switches' address table. If more than one second has passed (block 520), then operations instead return to block 500 to update connecting device MAC information in the bridge/switch by initiating traffic on the subnet. The timeout operations are provided as illustrated in FIG. 5 to account for the fact that bridge/switch devices typically retain information related to MAC addresses and connecting port number for only a limited time in their address tables. Currently, for example, such devices typically retain information only for approximately 2 seconds. However, it is to be understood that the use of active traffic generation is not required by the present invention. In any event, iterative operations as illustrated in FIG. 5 preferably continue until all entries in the address table of the bridge/switch have been obtained.

Figure 6:
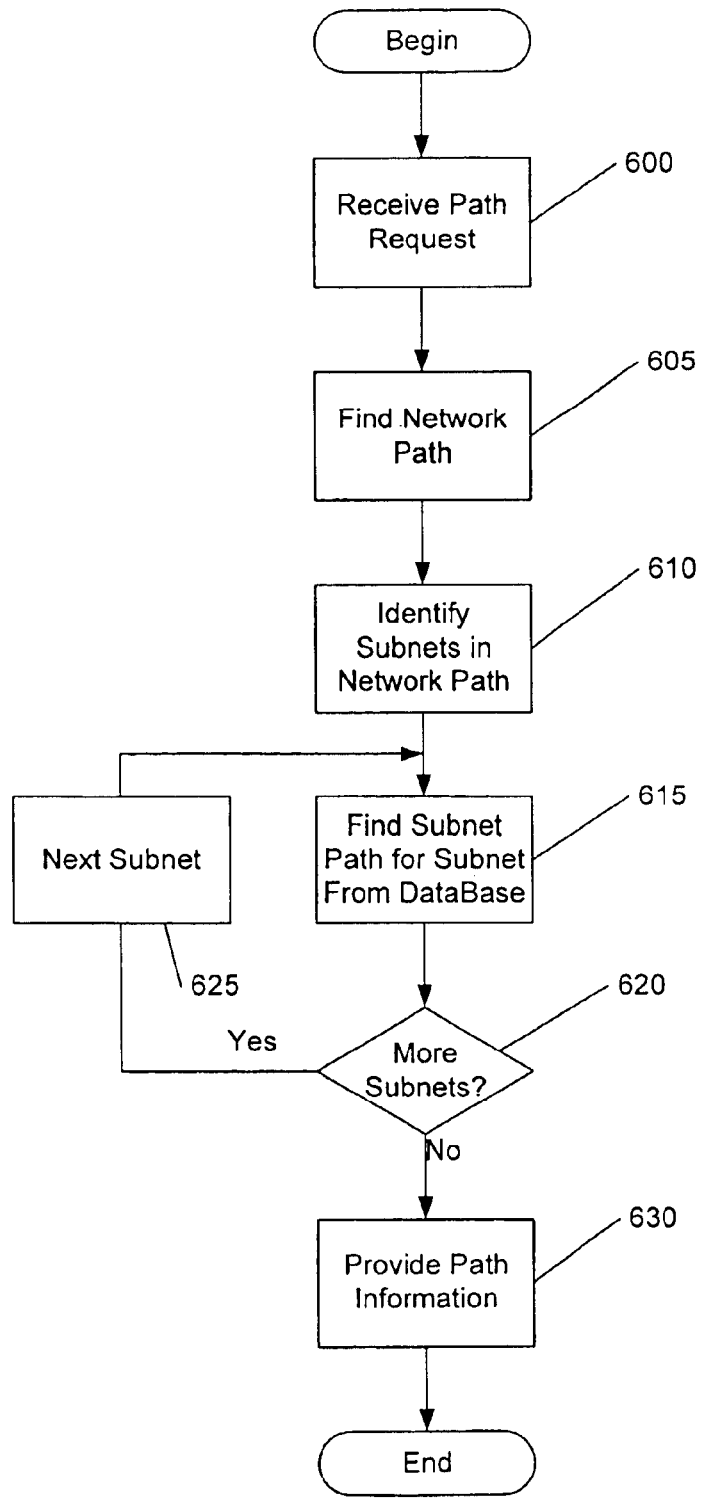
FIG. 6 is a flowchart illustrating operations for determining a network segment path according to further embodiments of the present invention.

Referring now to FIG. 6, operations for determining a network segment path between a first device and a second device over a communication network will now be further described according to various embodiments of the present invention. As shown in FIG. 6, network segment path evaluation operations may be initiated responsive to a path query request received by the NMS (block 600). A layer three network path is determined between the first device and the second device (block 605). The network path may, for example, be determined by executing an SNMP findroute operation. Using the determined network path information, subnets in the network path are identified (block 610). By way of illustration, with reference to FIG. 1, a network path between the server A 105 and the NMS 145 would include an identification of the server A 105, the router 1 120, the router 2 130 and the NMS 145. Subnets in the network path may then be identified by a first endpoint and a second endpoint in the network path for each subnet in the network path (block 610). Thus, the server A 105 and the router 1 120 would be a first endpoint and a second endpoint for one subnet and the router 2 130 and the NMS 145 would be a first and second endpoint for a second subnet. It would be expected that additional subnets would be identified within the IP network 125 illustrated in FIG. 1.

A subnet path is determined for each of the identified subnets in the network path using a link layer database as will be described with reference to blocks 615 through 625.

A first subnet is selected and the subnet path is determined for that segment using the link layer database (block 615). If there are more subnets (block 620), a next subnet is selected (block 625) and operations repeat at block 615. As shown in FIG. 6, where network segment path determination operations were initiated responsive to a received path request (block 600), once no more subnets remain (block 620), the obtained network segment path information is provided to the requester (block 630).

Operations for determining a subnet path for a subnet using a link layer database will now be further described with reference to FIG. 7 for embodiments of the present invention. A first path is found from the first endpoint to a root bridge/switch of the subnet using the link layer database as will be described with reference to blocks 700 through 710. Note that, in FIG. 7, the first endpoint device is referred to as A and the second endpoint device is referred to as B. Bridge/switch devices associated with the first endpoint are identified in the link layer database (block 700). For example, with reference to the exemplary database record format provided above, the attached device IP address/hostname field may be used as the search index during operations at block 700. In other words, all records containing an attached IP address value associated with device A may be identified at block 700.

Figure 7:
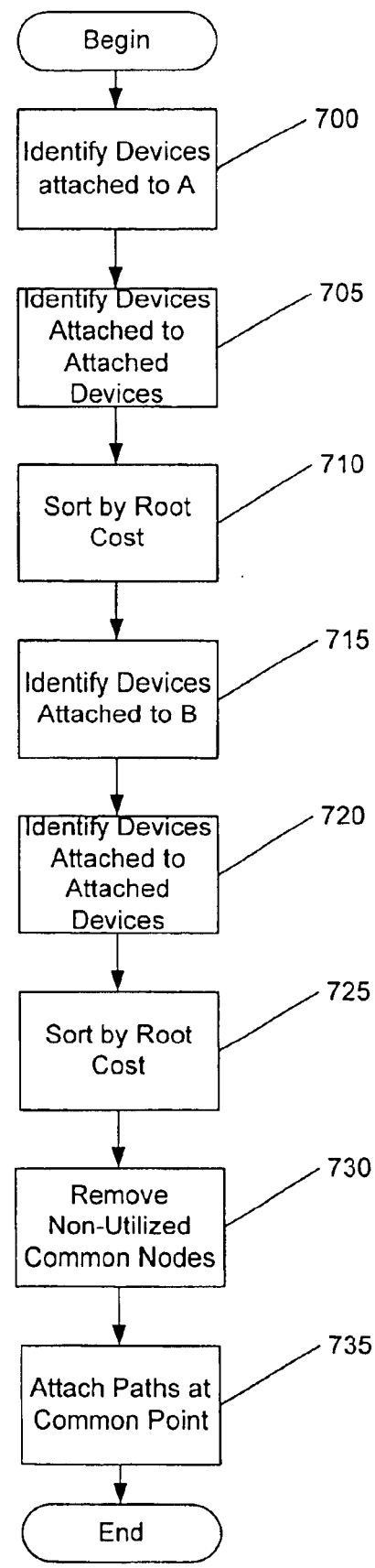
FIG. 7 is a flowchart illustrating operations for determining a subnet path for a subnet according to embodiments of the present invention.

For the embodiments illustrated in FIG. 7, additional subnet path information is obtained by identifying additional bridge/switch devices attached to the bridge/switch devices identified in block 700 (block 705). For example, if the server A 105 is identified as being connected to the bridge/switch 1 115, any other bridge/switch devices connected to the bridge/switch 1 115 are also identified in the link layer data base. Note that, with reference to the example record format provided previously, the search index for operations at block 705 is still the attached IP device address/hostname field, not the switch name (IP) field. The identified bridge/switches associated with the first endpoint A as well as additional bridge/switch devices identified at block 705 are sorted in root cost order from highest to lowest to provide the first path from the first endpoint A to the root bridge/switch of the subnet (block 710).

A second path is also found from the second endpoint B to the root bridge/switch of the subnet using the link layer data base. Associated operations for finding the second path at block 715 through 725 proceed as described previously with reference to block 700 through block 710 for the first path. Non-utilized common nodes of the first path and the second path may then be removed (block 730). The first and second path are connected at a common node point to provide the subnet path (block 735). By way of example, a subnet path between endpoints A and B may provide a path from A to the root bridge/switch (E) of A-C-D-E. The path from D to the root bridge/switch may identify B-F-G-D-E. In a typical network routing environment, as endpoints A and B each share a connection to a bridge/switch D, the additional common node E will be a non-utilized node. Accordingly, operations at block 730 would remove the non-utilized common node E and the first path and the second path would be connected at the common node D to result in a determined subnet path of A-C-D-G-F-B.

In various embodiments of the present invention, the associated connecting port number for each device along the path is further identified so that the resulting subnet path for each subnet will identify not only respective bridge/switch devices in the subnet path, but also the specific ports on each of those devices in the subnet path. Accordingly, operations as described with reference to FIG. 7 may provide a subnet path utilizing a link layer data base which includes link layer information obtained from at least one bridge/switch on a subnet that does not use layer three protocol information to process communications from a plurality of devices passing through the bridge/switch.

Figure 8:
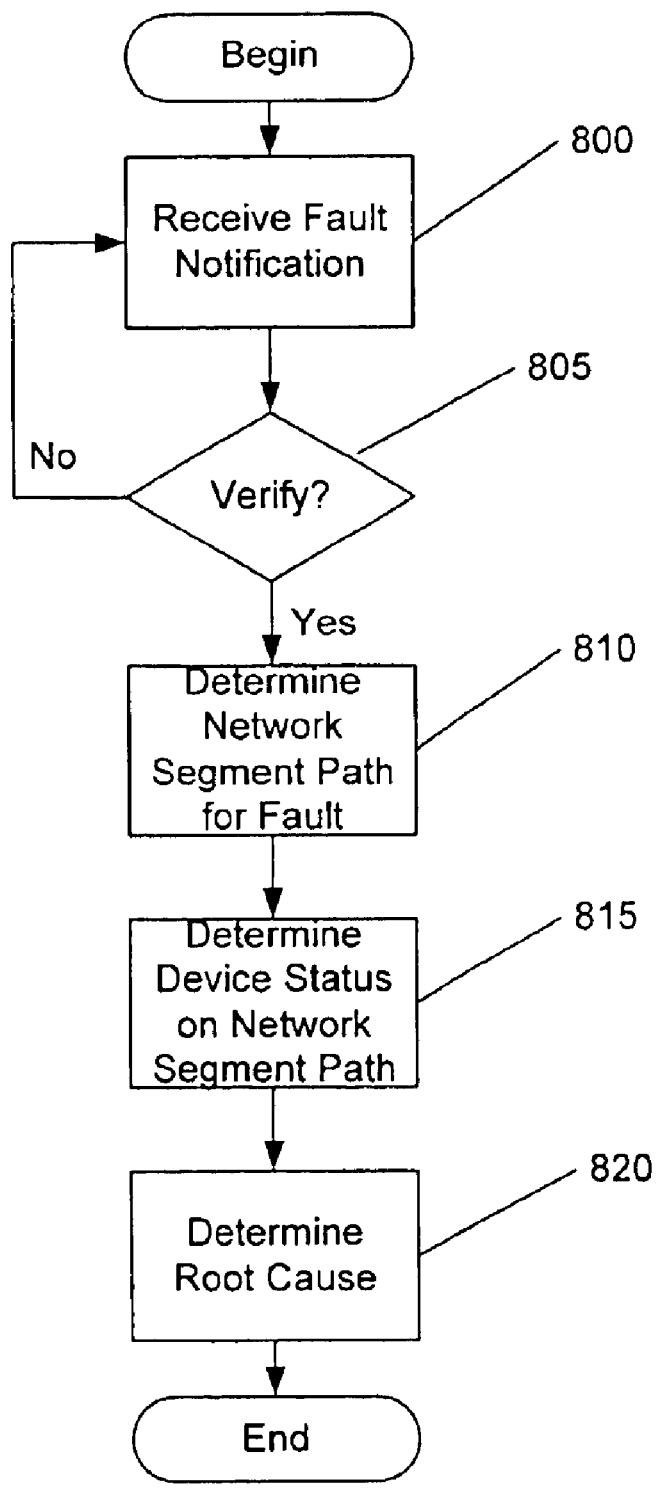
FIG. 8 is a flowchart illustrating operations for root cause analysis of faults on a communication network utilizing a link layer database according to embodiments of the present invention.

Referring now to FIG. 8, operations for root cause analysis of faults on a communication network according to embodiments of the present invention will be described. An indication of a fault on the communication network is received by the NMS (block 800). For example, NMS may receive an SNMP error trap from an enterprise management application such as NetView or OpenView. In the illustrated embodiments of FIG. 8, such a fault notification is verified before determining a network segment path for the fault (block 805). Verification before determining a network segment path and attempting root cause analysis of faults may be desirable where a large number of transient fault errors are generated on the communication network and filtering of fault information to reduce the volume of information provided to network management personnel also may be desirable.

Such transient network failure events may occur as a normal part of communication network operations, for example, data may be dropped because of network congestion or other transient conditions. Such transient network errors may be commonly encountered with both the NetView and the OpenView enterprise management systems. Such factors as wide area network (WAN) latency, network congestion, and busy devices can all lead to delays in, or loss of, communications such as network pings. Such transient conditions may, nonetheless, be reported by NetView and OpenView as a "node down" or "interface down" message, only to be followed shortly thereafter by a "node up" or "interface up" message. Verification operations at block 805 may filter out such transient network faults from the root cause analysis operations. Thus, if the reported condition goes away during the verification period, it may be treated as transient and ignored. By way of example, a two minute default verification period may be applied. A two minute period may be sufficient for most communication network device applications although different default periods may be desired. For example, if Windows NT server automatic reboots are to be ignored, a default verification period of five minutes may be more effective than a two minute default verification period.

Active verification may be provided, for example, by the use of the "ping" command. Such an approach will typically be effective for verification of node or interface failure conditions on an IP network. However, a different verification command may be specified. For example, a "topping" command may be used for verifying a TCP server and an SNMP "query" command may be used to verify failed components. Pings can also be configured in protocols other than the Internet protocol. In addition, a verification command may be issued which simply checks the status in a key file or database rather than over the network itself. Furthermore, the verification ping command may be executed a plurality of times, for example, four times, over the default verification period. If no ping events are specified, the verification procedure may still be utilized in a passive manner by waiting the specified time period for the fault condition to go away.

If the fault condition is verified (block 805), the network segment path associated with the fault is determined (block 810). The network segment path determined at block 810 includes an identification of connecting nodes in the network segment path that do not provide layer three, for example, IP, protocol information on communications passing through the connecting nodes as was described generally above with reference to FIGS. 4 through 7. Status information for connecting nodes in the determined network segment path is obtained (block 815). A root cause connecting node for the fault is determined based on the determined network segment path and the obtained status information (block 820).

Accordingly, utilizing a link layer data base, a network management station may determine if a device upstream between the network management station and the point of failure is actually the root cause device. If a failure upstream is detected, that event may then be reported as the root cause rather than the originally reported failure. By actively determining device status in the path at block 815, the illustrated embodiments may provide faster and more accurate root cause analysis. For example, passive correlation relying on scheduled round robin polling of devices as is typically provided by NetView and OpenView may necessitate waiting until the polling makes its way around to the failure path. Furthermore, delays in relying on passive reliance may generate erroneous root cause analysis information where the reported data may not be up to date at the point in time of the outage for all of the potentially affected connecting devices. Through utilization of active verification of devices along the failure device path responsive to a verified fault, root cause identification may occur quickly, for example, in less than two seconds in some circumstances. Pass through notification to users may thus be provided. In addition, by utilizing link layer (layer 2) information, the root cause analysis is not limited to layer three Internet protocol identifying devices and may further support other layer three protocols using layer two MAC address information.

In a further aspect of root cause analysis, cloud correlation technology (CCT) may be beneficially utilized. CCT may be utilized to process elements in a network path that cannot be otherwise verified by a query from the NMS. Contiguous non-verifiable devices can be grouped and identified as a cloud such as a carrier-provided frame relay cloud, a dumb hub, an unmanageable router or an unverifiable network junction. Users need only configure initial information defining the cloud's near and far interfaces to support identification using root cause analysis of a particular cloud as the root cause.

By way of example referring to the layout of FIG. 1, with reference to the NMS station 145, if server A 105 is down, applications such as NetView/OpenView would typically report server A as down as would the root cause analysis operations described with reference to FIG. 8. However, if the router 2 130 was the device which was down, NetView/OpenView would be expected to report that router 2 130, router 1 120, switch 1 115, server A 105 and server B 110 were all down. In contrast, the root cause analysis as described with reference to FIG. 8 may be used to identify router 2 130 as down rather than the remaining upstream devices.

Once a failure has been verified and its root cause discovered, notification may be provided to network personnel responsible for resolving the problem. For example, an alpha-numeric page may be initiated, an e-mail may be transmitted, an alert may be displayed in a pop up box, events may be logged to a file, and communications may be provided to other software applications associated with notification of failures. For example, SNMP traps can be directed to other notification software applications. In addition, notification groups may be designated for one or more of the above notification options.

The flowcharts and block diagrams of FIGS. 1 through 8 illustrate the architecture, functionality, and operation of possible implementations providing network segment path and root cause analysis for faults on a communication network according to the present invention. In this regard, each block in the flow charts or block diagrams represents a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may in fact be executed substantially concurrently or the blocks may sometimes be executed in the reverse order, depending upon the functionality involved. Furthermore, in certain embodiments of the present invention, such as object oriented programming embodiments, the sequential nature of the flowcharts may be replaced with an object model such that operations and/or functions may be performed in parallel or sequentially.

Furthermore, fewer or more functions may be provided as well as functions which are identified as separate functions may be combined while still coming within the teachings of the present invention. For example, the network segment path evaluator 310 is shown as a single application, however, this application could be two or more applications. Thus, the present invention should not be construed as limited to the specific configurations illustrated but is intended to cover all configurations which may carry out the operations described herein.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for finding a network segment path for a communication on a communication network supporting Internet protocol (IP) communications, the method comprising:

obtaining link layer information from at least one connecting node on the communication network that does not use layer three Internet protocol information to process communications from a plurality of devices passing through the at least one connecting node based on the Internet protocol; and determining the network segment path for the communication on the communication network based on the obtained link layer information, the network segment path including an identification of connecting nodes in the network segment path that do not use layer three Internet protocol information to process communications from a plurality of devices passing through the at least one connecting node based on the Internet protocol.

2. The method of claim 1 wherein the at least one connecting node is a bridge/switch.

3. The method of claim 2 wherein obtaining link layer information further comprises obtaining an identification of the plurality of devices from the bridge/switch.

4. The method of claim 3 wherein obtaining an identification further comprises obtaining a media access controller (MAC) address and an associated connecting port number of the bridge/switch for the plurality of devices.

5. The method of claim 4 wherein obtaining a MAC address further comprises storing obtained MAC addresses and associated connecting port numbers along with an identification of the bridge/switch and respective ones of the plurality of devices as records in a link layer data base.

6. The method of claim 5 wherein storing obtained MAC addresses further comprises time stamping the records and wherein obtaining a MAC address further comprises aging out records in the link layer data base.

7. A method for finding a network segment path for a communication on a communication network comprising:

obtaining link layer information from a bridge/switch on the communication network that does not use layer three protocol information to process communications from a plurality of devices passing through the bridge/switch based on the Internet protocol, including:
obtaining a media access controller (MAC) address and an associated connecting port number of the bridge/switch for the plurality of devices to provide records;
time stamping the records;
storing the records in a link layer data base; and
aging out records in the link layer data base;

determining the network segment path for the communication on the communication network based on the obtained link layer information, the network segment path including an identification of connecting nodes in the network segment path that do not use layer three protocol information to process communications from a plurality of devices passing through the at least one connecting node; and wherein aging out records comprises:

detecting duplicate records and deleting an older one of detected duplicate records;

detecting conflicts between records indicating movement of at least one of the bridge/switch and one of the plurality of devices; and deleting records associated with a detected conflict.

8. The method of claim 7 wherein detecting conflicts between records indicating movement further comprises detecting connection of one of the plurality of devices to a plurality of bridge/switches having the same root cost to detect movement of the one of the plurality of devices and wherein deleting records associated with a detected conflict comprises:

deleting all records associated with a moved bridge/switch; and deleting records associated with the one of the plurality of devices having a time stamp older than at least one other record associated with the one of the plurality of devices.

9. A method for finding a network segment path for a communication on a communication network comprising:

obtaining link layer information from a bridge/switch on the communication network that does not use layer three protocol information to process communications from a plurality of devices passing through the bridge/switch, including obtaining a media access controller (MAC) address and an associated connecting port number of the bridge/switch for the plurality of devices; and determining the network segment path for the communication on the communication network based on the obtained link layer information, the network segment path including an identification of connecting nodes in the network segment path that do not use layer three protocol information to process communications from a plurality of devices passing through the bridge/switch; and wherein the plurality of devices and the bridge/switch are on a subnet and wherein obtaining a media access controller (MAC) address and an associated connecting port number of the bridge/switch for the plurality of devices is preceded by initiating communications traffic by the plurality of devices on the subnet.

10. The method of claim 9 wherein obtaining a media access controller (MAC) address and an associated connecting port number of the bridge/switch for the plurality of devices comprises iteratively querying the bridge/switch for next entries in an address table of the bridge/switch using MIB commands until all entries in the address table have been obtained.

11. The method of claim 10 wherein iteratively querying the bridge/switch for next entries further comprises initiating communications traffic by the plurality of devices on the subnet if a specified time is exceeded before all entries in the address table have been obtained.

12. A method for finding a network segment path for a communication on a communication network comprising:
    obtaining link layer information from at least one connecting node on the communication network that does not use layer three protocol information to process communications from a plurality of devices passing through the at least one connecting node; and
    determining the network segment path for the communication on the communication network based on the obtained link layer information, the network segment path including an identification of connecting nodes in the network segment path that do not use layer three protocol information to process communications from a plurality of devices passing through the at least one connecting node; and
    wherein the communication is between a first device and a second device and wherein determining the network segment path for a communication on the communication network comprises:
    determining a network path between the first device and the second device;
    identifying subnets in the network path; and
    determining a subnet path for each of the identified subnets in the network path using a link layer data base.

13. The method of claim 12 wherein identifying subnets in the network path further comprises identifying a first endpoint and a second endpoint in the network path for each subnet in the network path.

14. The method of claim 13 wherein determining a subnet path further comprises the following executed for each subnet:
    finding a first path from the first endpoint to a root bridge/switch of the subnet using the link layer data base;
    finding a second path from the second endpoint to the root bridge/switch of the subnet using the link layer data base;
    removing non-utilized common nodes of the first path and the second path; and
    connecting the first path and the second path at a common node.

15. The method of claim 14 wherein connecting the first path and the second path at a common node is preceded by determining an associated port number for each node along the first path and the second path from the link layer data base.

16. The method of claim 14 wherein finding a first path further comprises:
    identifying bridges/switches associated with the first endpoint in the link layer data base;
    ordering the identified bridges/switches associated with the first endpoint in root cost order from highest to lowest to provide the first path.

17. The method of claim 16 wherein ordering the identified bridges/switches is preceded by identifying in the link layer data base additional bridges/switches associated with the identified bridges/switches and wherein ordering the identified bridges/switches further comprises ordering the identified bridges/switches associated with the first endpoint and the additional bridges/switches in root cost order from highest to lowest to provide the first path.

18. The method of claim 17 wherein finding a second path further comprises:
    identifying second path bridges/switches associated with the second endpoint in the link layer data base;
    ordering the identified second path bridges/switches associated with the second endpoint in root cost order from highest to lowest to provide the second path.

19. The method of claim 18 wherein ordering the identified second path bridges/switches is preceded by identifying in the link layer data base additional bridges/switches associated with the identified second path bridges/switches and wherein ordering the identified second path bridges/switches further comprises ordering the identified bridges/switches associated with the second endpoint and the additional second path bridges/switches in root cost order from highest to lowest to provide the second path.

20. The method of claim 19 wherein determining a network path between the first device and the second device comprises executing a SNMP findroute operation.

21. A method for determining a path between a first endpoint and a second endpoint on a subnet comprising:
    finding a first path from the first endpoint to a root bridge/switch of the subnet using a link layer data base;
    finding a second path from the second endpoint to the root bridge/switch of the subnet using the link layer data base;
    removing non-utilized common nodes of the first path and the second path; and
    connecting the first path and the second path at a common node.

22. The method of claim 21 wherein the link layer data base comprises link layer information obtained from at least one bridge/switch on the subnet that does not use layer three protocol information to process communications from a plurality of devices passing through the at least one bridge/subnet.

23. The method of claim 22 wherein connecting the first path and the second path at a common node is preceded by determining an associated port number for each node along the first path and the second path from the link layer data base.

24. The method of claim 22 wherein finding a first path further comprises:
    identifying bridges/switches associated with the first endpoint in the link layer data base;
    ordering the identified bridges/switches associated with the first endpoint in root cost order from highest to lowest to provide the first path.

25. The method of claim 24 wherein ordering the identified bridges/switches is preceded by identifying in the link layer data base additional bridges/switches associated with the identified bridges/switches and wherein ordering the identified bridges/switches further comprises ordering the identified bridges/switches associated with the first endpoint and the additional bridges/switches in root cost order from highest to lowest to provide the first path.

26. The method of claim 24 wherein finding a second path further comprises:
    identifying second path bridges/switches associated with the second endpoint in the link layer data base;
    ordering the identified second path bridges/switches associated with the second endpoint in root cost order from highest to lowest to provide the second path.

27. The method of claim 26 wherein ordering the identified bridges/switches is preceded by identifying in the link layer data base additional bridges/switches associated with the identified second path bridges/switches and wherein ordering the identified second path bridges/switches further comprises ordering the identified bridges/switches associated with the second endpoint and the additional second path bridges/switches in root cost order from highest to lowest to provide the second path.

28. A system for finding a network segment path for a communication on a communication network supporting Internet protocol (IP) communications, the method comprising:
    means for obtaining link layer information from at least one connecting node on the communication network that does not use layer three Internet protocol information to process communications from a plurality of devices passing through the at least one connecting node based on the Internet protocol; and
    means for determining the network segment path for the communication on the communication network based on the obtained link layer information, the network segment path including an identification of connecting nodes in the network segment path that do not use layer three Internet protocol information to process communications from a plurality of devices passing through the at least one connecting node based on the Internet protocol.

29. The system of claim 28 wherein the at least one connecting node is a bridge/switch.

30. The system of claim 29 wherein the means for obtaining link layer information further comprises means for obtaining an identification of the plurality of devices from the bridge/switch, the identification including a media access controller (MAC) address and an associated connecting port number of the bridge/switch for the plurality of devices.

31. The system of claim 30 further comprising means for storing obtained MAC addresses and associated connecting port numbers along with an identification of the bridge/switch and the respective ones of the plurality of devices as records in a link layer data base.

32. The system of claim 31 wherein the means for storing further comprises means for time stamping the records and wherein means for obtaining link layer information further comprises means for aging out records in the link layer data base.

33. A system for finding a network segment path for a communication on a communication network, comprising:
    means for obtaining link layer information from a bridge/switch on the communication network that does not use layer three protocol information to process communications from a plurality of devices passing through the bridge/switch, the means for obtaining link layer information including means for obtaining an identification of the plurality of devices from the bridge/switch, the identification including a media access controller (MAC) address and an associated connecting port number of the bridge/switch for the plurality of devices; and
    means for determining the network segment path for the communication on the communication network based on the obtained link layer information, the network segment path including an identification of connecting nodes in the network segment path that do not use layer three protocol information to process communications from a plurality of devices passing through the bridge/switch; and
    wherein the means for obtaining an identification further comprises means for iteratively querying the bridge/switch for next entries in an address table of the bridge/switch using MIB commands until all entries in the address table have been obtained.

34. The system of claim 33 wherein the means for iteratively querying the bridge/switch for next entries further comprises means for initiating communications traffic by the plurality of devices on the subnet if a specified time is exceeded before all entries in the address table have been obtained.

35. A system for finding a network segment path for a communication on a communication network, comprising:
    means for obtaining link layer information from a bridge/switch on the communication network that does not use layer three protocol information to process communications from a plurality of devices passing through the bridge/switch; and
    means for determining the network segment path for the communication on the communication network based on the obtained link layer information, the network segment path including an identification of connecting nodes in the network segment path that do not use layer three protocol information to process communications from a plurality of devices passing through the bridge/switch; and
    wherein the communication is between a first device and a second device and wherein the means for determining the network segment path for a communication over the communication network comprises:
    means for determining a network path between the first device and the second device;
    means for identifying subnets in the network path; and
    means for determining a subnet path for each of the identified subnets in the network path using a link layer data base.

36. The system of claim 35 wherein the means for identifying subnets in the network path further comprises means for identifying a first endpoint and a second endpoint in the network path for each subnet in the network path and wherein the means for determining a subnet path further comprises:
    means for finding a first path from the first endpoint to a root bridge/switch of a subnet using the link layer data base;
    means for finding a second path from the second endpoint to the root bridge/switch of the subnet using the link layer data base;
    means for removing non-utilized common nodes of the first path and the second path; and
    means for connecting the first path and the second path at a common node.

37. The system of claim 36 wherein the means for finding a first path further comprises:
    means for identifying bridges/switches associated with the first endpoint in the link layer data base;
    means for ordering the identified bridges/switches associated with the first endpoint in root cost order from highest to lowest to provide the first path.

38. The system of claim 37 further comprising means for identifying in the link layer data base additional bridges/switches associated with the identified bridges/switches and wherein the means for ordering the identified bridges/switches further comprises means for ordering the identified bridges/switches associated with the first endpoint and the additional bridges/switches in root cost order from highest to lowest to provide the first path.

39. A system for determining a path between a first endpoint and a second endpoint on a subnet comprising:
    means for finding a first path from the first endpoint to a root bridge/switch of the subnet using a link layer data base;
    means for finding a second path from a second endpoint to the root bridge/switch using the link layer data base;
    means for removing non-utilized common nodes of the first path and the second path; and
    means for connecting the first path and the second path at a common node.

40. The system of claim 39 wherein the link layer data base comprises link layer information obtained from at least one bridge/switch on the subnet that does not use layer three protocol information to process communications from a plurality of devices passing through the at least one bridge/subnet.

41. The system of claim 40 wherein the means for finding a first path further comprises:
    means for identifying bridges/switches associated with the first endpoint in the link layer data base;
    means for ordering the identified bridges/switches associated with the first endpoint in root cost order from highest to lowest to provide the first path.

42. A computer program product for finding a network segment path for a communication on a communication network supporting Internet protocol (IP) communications, the method comprising:
    a computer-readable storage medium having computer-readable program code embodied in said medium, said computer-readable program code comprising:
    computer-readable program code which obtains link layer information from at least one connecting node on the communication network that does not use layer Internet three protocol information to process communications from a plurality of devices passing through the at least one connecting node based on the Internet protocol; and
    computer-readable program code which determines the network segment path for the communication on the communication network based on the obtained link layer information, the network segment path including an identification of connecting nodes in the network segment path that do not use layer three Internet protocol information to process communications from a plurality of devices passing through the at least one connecting node based on the Internet protocol.

43. The computer program product of claim 42 wherein the at least one connecting node is a bridge/switch.

44. The computer program product of claim 43 wherein the computer-readable program code which obtains link layer information further comprises computer-readable program code which obtains an identification of the plurality of devices from the bridge/switch, the identification including a media access controller (MAC) address and an associated connecting port number of the bridge/switch for the plurality of devices.

45. The computer program product of claim 44 further comprising computer-readable program code which stores obtained MAC addresses and associated connecting port numbers along with an identification of the bridge/switch and the respective ones of the plurality of devices as records in a link layer data base.

46. The computer program product of claim 45 wherein the computer-readable program code which stores further comprises computer-readable program code which time stamps the records and wherein computer-readable program code which obtains link layer information further comprises computer-readable program code which ages out records in the link layer data base.

47. A computer program product for finding a network segment path for a communication on a communication network, comprising:
    a computer-readable storage medium having computer-readable program code embodied in said medium, said computer-readable program code comprising:
    computer-readable program code which obtains link layer information from a bridge/switch on the communication network that does not use layer three protocol information to process communications from a plurality of devices passing through the bridge/switch, the computer-readable program code which obtains link layer information including computer-readable program code which obtains an identification of the plurality of devices from the bridge/switch, the identification including a media access controller (MAC) address and an associated connecting port number of the bridge/switch for the plurality of devices; and
    computer-readable program code which determines the network segment path for the communication on the communication network based on the obtained link layer information, the network segment path including an identification of connecting nodes in the network segment path that do not use layer three protocol information to process communications from a plurality of devices passing through the bridge/switch; and
    wherein the computer-readable program code which obtains an identification further comprises computer-readable program code which iteratively queries the bridge/switch for next entries in an address table of the bridge/switch using MIB commands until all entries in the address table have been obtained.

48. The computer program product of claim 47 wherein the computer-readable program code which iteratively queries the bridge/switch for next entries further comprises computer-readable program code which initiates communications traffic by the plurality of devices on the subnet if a specified time is exceeded before all entries in the address table have been obtained.

49. A computer program product for finding a network segment path for a communication on a communication network, comprising:
    a computer-readable storage medium having computer-readable program code embodied in said medium, said computer-readable program code comprising:
    computer-readable program code which obtains link layer information from a bridge/switch on the communication network that does not use layer three protocol information to process communications from a plurality of devices passing through the bridge/switch; and
    computer-readable program code which determines the network segment path for the communication on the communication network based on the obtained link layer information, the network segment path including an identification of connecting nodes in the network segment path that do not use layer three protocol information to process communications from a plurality of devices passing through the bridge/switch; and wherein the communication is between a first device and a second device and wherein the computer-readable program code which determines the network segment path for a communication over the communication network comprises:

computer-readable program code which determines a network path between the first device and the second device;

computer-readable program code which identifies subnets in the network path; and computer-readable program code which determines a subnet path for each of the identified subnets in the network path using a link layer data base.

50. The method of claim 49 wherein the computer-readable program code which identifies subnets in the network path further comprises computer-readable program code which identifies a first endpoint and a second endpoint in the network path for each subnet in the network path and wherein the computer-readable program code which determines a subnet path further comprises:

computer-readable program code which finds a first path from the first endpoint to a root bridge/switch of a subnet using the link layer data base;

computer-readable program code which finds a second path from the second endpoint to the root bridge/switch of the subnet using the link layer data base;

computer-readable program code which removes non-utilized common nodes of the first path and the second path; and computer-readable program code which connects the first path and the second path at a common node.

51. The computer program product of claim 50 wherein the computer-readable program code which finds a first path further comprises:

computer-readable program code which identifies bridges/switches associated with the first endpoint in the link layer data base;

computer-readable program code which orders the identified bridges/switches associated with the first endpoint in root cost order from highest to lowest to provide the first path.

52. The computer program product of claim 51 further comprising computer-readable program code which identifies in the link layer data base additional bridges/switches associated with the identified bridges/switches and wherein the computer-readable program code which orders the identified bridges/switches further comprises computer-readable program code which orders the identified bridges/switches associated with the first endpoint and the additional bridges/switches in root cost order from highest to lowest to provide the first path.

53. A computer program product for determining a path between a first endpoint and a second endpoint on a subnet comprising:

a computer-readable storage medium having computer-readable program code embodied in said medium, said computer-readable program code comprising:

computer-readable program code which finds a first path from the first endpoint to a root bridge/switch of the subnet using a link layer data base;

computer-readable program code which finds a second path from a second endpoint to the root bridge/switch using the link layer data base;

computer-readable program code which removes non-utilized common nodes of the first path and the second path; and computer-readable program code which connects the first path and the second path at a common node.

54. The computer program product of claim 53 wherein the link layer data base comprises link layer information obtained from at least one bridge/switch on the subnet that does not use layer three protocol information to process communications from a plurality of devices passing through the at least one bridge/subnet.

55. The computer program product of claim 54 wherein the computer-readable program code which finds a first path further comprises:

computer-readable program code which identifies bridges/switches associated with the first endpoint in the link layer data base;

computer-readable program code which orders the identified bridges/switches associated with the first endpoint in root cost order from highest to lowest to provide the first path.

* * * * *